United States Patent [19]

Mazzola

[11] Patent Number: 5,461,624
[45] Date of Patent: Oct. 24, 1995

[54] DISTRIBUTED ROUTING NETWORK ELEMENT

[75] Inventor: Anthony J. Mazzola, Plano, Tex.

[73] Assignee: Alcatel Network Systems, Inc., Richardson, Tex.

[21] Appl. No.: 289,178

[22] Filed: Aug. 11, 1994

Related U.S. Application Data

[63] Continuation of Ser. No. 856,604, Mar. 24, 1992, abandoned.

[51] Int. Cl.⁶ .................................................. H04L 12/66
[52] U.S. Cl. ........................................ 370/85.13; 370/94.1
[58] Field of Search .......................... 370/85.13, 85.14, 370/85.9, 85.12, 94.1, 94.2, 94.3, 60, 60.1, 85.15

[56] References Cited

U.S. PATENT DOCUMENTS

| | | | |
|---|---|---|---|
| 4,947,390 | 8/1990 | Sheehy | 370/85.13 |
| 5,018,137 | 5/1991 | Buckes et al. | 370/85.13 |
| 5,081,621 | 1/1992 | Sugimoto | 370/85.13 |
| 5,086,428 | 2/1992 | Perlman et al. | 370/94.1 |
| 5,088,090 | 2/1992 | Yacoby | 370/85.13 |
| 5,111,453 | 5/1992 | Morrow | 370/94.1 |
| 5,151,897 | 9/1992 | Suzuki | 370/85.13 |

*Primary Examiner*—Douglas W. Olms
*Assistant Examiner*—Ajit Patel
*Attorney, Agent, or Firm*—Vinson & Elkins

[57] ABSTRACT

A network element includes a plurality of routing circuits coupled by internal communication circuitry. Each routing circuit includes one or more external ports for communicating with external devices, one or more internal ports for communicating with other of the routing circuits, a database for storing address and path information received via the internal and external ports and circuitry for retransmitting address information received from an external device to other of the routing circuits.

17 Claims, 3 Drawing Sheets

DISTRIBUTED ROUTING NETWORK ELEMENT

RELATED APPLICATIONS

This application is a Continuation of application Ser. No. 07/856,604, filed Mar. 24, 1992, and entitled "DISTRIBUTED ROUTING NETWORK ELEMENT", now abandoned.

TECHNICAL FIELD OF THE INVENTION

This invention relates in general to communication systems, and more particularly to a distributed routing network element.

BACKGROUND OF THE INVENTION

In a digital communication system, using a standard such as SONET, packets of information ("messages") are routed between network elements. A message may be routed through many network elements on its path from source to destination. Typically, the routing for all channels connected to a network element is performed on a single card.

Processing all channels of a network element on a single card poses several problems. Technically, there are limitations as to how many channels can be efficiently routed using a single card. Further, purchasers of a network element would often prefer not to have a card designed for a preset number of channels, which may force them to purchase a network element with excess capacity or a network element which may have insufficient capacity at a later date.

The routing function can be made scalable, i.e., capable of expansion or contraction, by distributing the routing over a plurality of cards (hereinafter "circuit packs"). In the prior art, each circuit pack uses a proprietary protocol for exchanging routing databases between circuit paths in a network element. The proprietary protocol must be supported in the routing hardware as well. Thus, the design of a distributed routing network element requires a significant cost in development over an existing single-card routing design. Further, the exchange of database information can often be complex, and therefore, slow.

Therefore, a need has arisen in the industry for a distributed routing architecture which may be adapted to prior single-card architectures without significant additional development effort. Further, the distributed routing function should not add significant delay to the transport of messages.

SUMMARY OF THE INVENTION

In accordance with the present invention, a distributed routing method and apparatus is provided which substantially eliminates problems associated with prior routing devices.

In the present invention, a network for use in a digital communication system comprises a plurality of routing circuits coupled by internal communication circuitry. Each routing circuit of the network element comprises one or more external ports for communicating with external devices, one or more internal ports for communicating with other of the routing circuits, a database for storing address and path information received via the internal and external ports, and circuitry for retransmitting address information received from an external device to other of the routing circuits.

The present invention provides significant advantages over the prior art. By communicating information received from external devices to other routing circuits via an internal path, the database for each routing circuit may be easily updated. Further, conversion from a single-card network element design to a distributed routing network element design may be easily accomplished, since the present invention requires only a slight change to the database function and the addition of an internal communications ports. The present invention provides for a network element which is fully scalable, i.e., cards can be added and removed from the network element to increase or decrease capacity.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
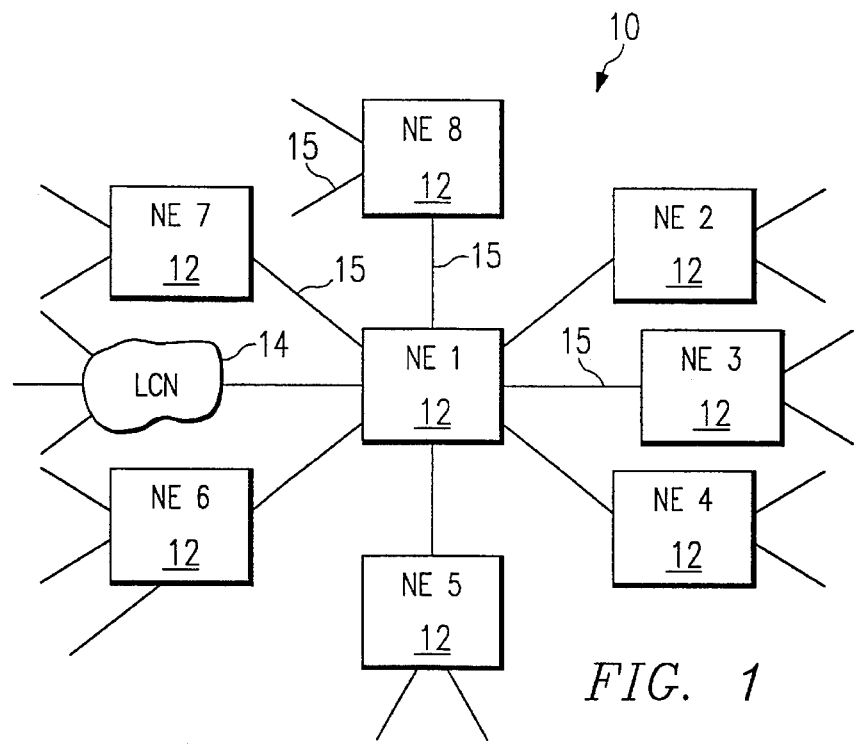
FIG. 1 illustrates a block diagram of a digital communication network.

FIG. 1 illustrates a communications network 10 comprising a plurality of network elements 12 and local communication networks (LCN) 14. In the preferred embodiment, network elements are coupled using optical fiber 15; a network element may also be electrically coupled to optical fiber via the LCN 14.

In the preferred embodiment, each network element 12 of the communication network 10 is assigned a unique NSAP address, which is administered in part by IEEE. For illustrative purposes, the network elements shown in FIG. 1 have been assigned addresses NE1–NE8. In actual use, the NSAP address has fields which identify the locality of the network element by area and region within the network area, much like a zip code number or telephone number. Some of the fields may be defined by the user. Network Element addressing is discussed in greater detail in ISO 8348 Addendum 2.

In FIG. 1, network element NE1 is coupled to network elements NE2–NE8 and to LCN 14 using a star topology. Each of the network elements NE2–NE8 are coupled to other network elements. While a star topology is used for illustrative purposes, the present invention may be used with other topologies, such as a ring configuration, or a combination of different topologies.

In the preferred embodiment, an ES-IS routing exchange protocol (ISO 9542) is used for routing messages through the communication network. In an ES-IS routing exchange protocol, each network element broadcasts its NSAP address to each network element to which it is directly connected (a "neighbor" network element). The broadcast of the NSAP address (hereinafter, the "Hello PDU") is repeated at predetermined intervals. Thus, for example, NE1 will broadcast its Hello PDU to network elements NE2–NE8 at regular predetermined intervals. Upon receiving the Hello PDU, network elements NE2-NE8 store the NSAP address in their respective databases along with path information regarding the path through which the Hello PDU was received. Similarly, network element NE1 will receive Hello PDUs from the network elements to which it is connected. Consequently, each network element maintains a database (the ES-IS database) which stores the address and path information for each neighbor network element to which it is connected. In a second predetermined time period, each network element 12 also updates its ES-IS database to remove entries which have not been updated. The period for updating the database is twice as long as the period between Hello PDU broadcasts from a neighboring network element. As a result, each network element's ES-IS database is automatically maintained, without the need for reconfiguring database each time a network element is added or removed from the communications network 10.

Using the ES-IS protocol, messages may be efficiently routed through the communications network 10. For example, if network element NE6 receives a message addressed to network element NE1, network element NE6 will retrieve the path information from its ES-IS database and route the message to NE1 over the path on which it received the Hello PDU from NE1. If a network element receives a message addressed to a network element whose address is not in its database (i.e., a non-neighbor network element), then the message will be passed along in accordance with a predetermined algorithm, as is well known in the art.

Figure 2A:
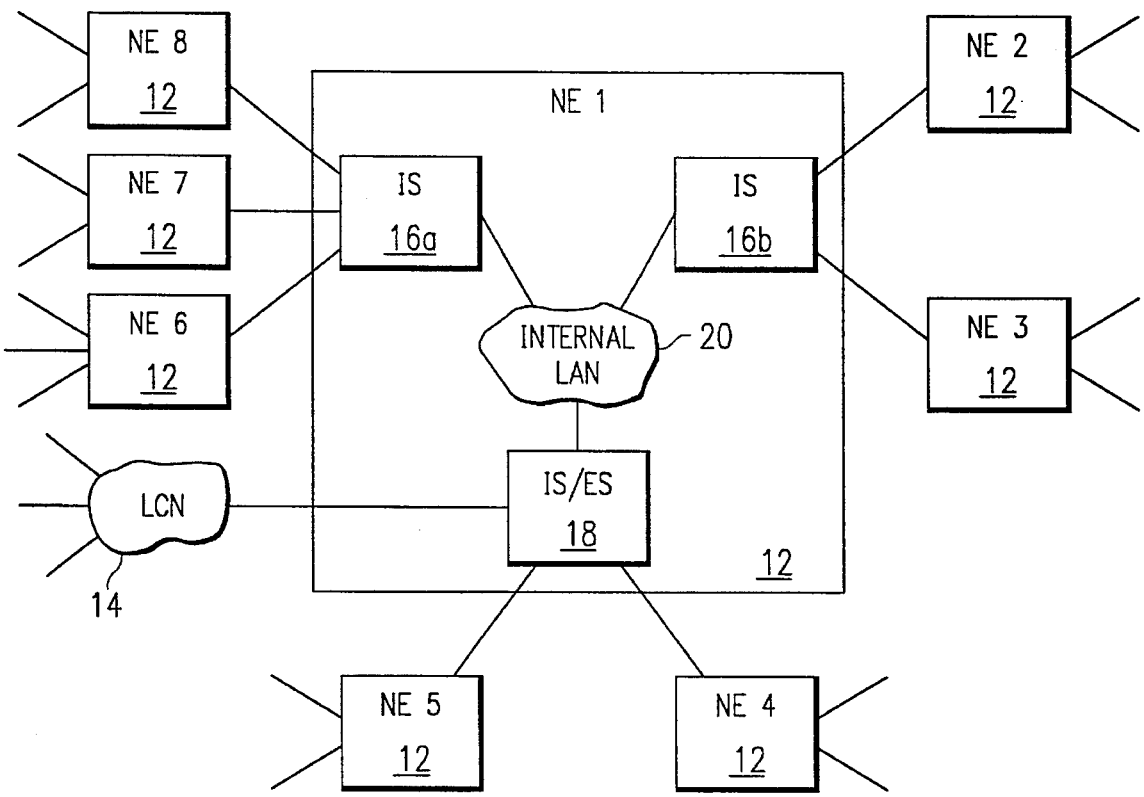
FIGS. 2a–b illustrate block diagrams of the network elements of the present invention.
Figure 2B:
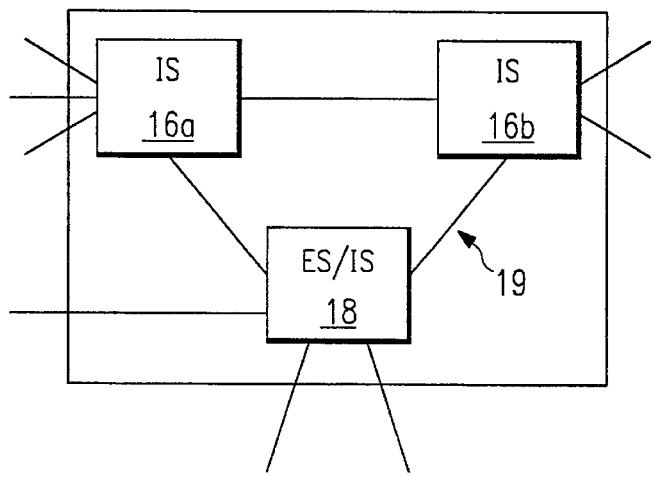

FIGS. 2a–b illustrate block diagrams of a preferred embodiment of a network element 12 using distributed routing. In FIG. 2a, the network element 12 comprises two IS circuit packs, referenced generally by reference number 16 and more particularly by reference numerals 16a and 16b, and an IS/ES circuit pack 18. The IS circuit packs 16 and ES/IS circuit pack 18 are connected via an internal local area network 20. The IS circuit packs 16 and IS/ES circuit pack 18 are coupled to other network elements 12. IS/ES circuit pack 18 is also coupled to LCN 14.

Each IS (intermediate system) circuit pack 16 is operable to route messages to and from the network elements 12 to which it is connected. An ES (end system) is capable of being the destination of a message. An IS/ES circuit pack 18 can both route a message and be the destination of a message. Whereas in the prior art, both ES's and IS's send Hello PDUs, in the preferred embodiment described herein, only the ES (or IS/ES) is responsible for transmitting the Hello PDU for the network element. Block diagrams for IS and ES/IS circuit packs are shown in greater detail in connection with FIGS. 4a–b.

FIG. 2b illustrates a block diagram of an alternative topology for the preferred embodiment. In this topology, the IS circuit packs 16 and ES/IS circuit pack 18 are coupled in a ring 19. External connections to the network elements 12 are the same as in FIG. 2a; however, each circuit pack has a direct internal connection with its neighbor circuit pack, rather than through a internal LAN 20. Other topologies for the interrelation between circuit packs 16 and 18 could also be used without departing from the scope of the present invention, as would be known to one skilled in the art.

In operation, as each IS 16 or IS/ES 18 receives a Hello PDU from an external network element 12, that circuit pack will forward the Hello PDU to other circuit packs to which it is connected. Hence, in FIG. 2a, IS circuit pack 16a will, for example, receive the Hello PDU from network element NE7. IS circuit pack 16a, upon receiving the Hello PDU from NE7, will retransmit this message to IS circuit pack 16b and to IS/ES circuit pack 18 through the LAN 20. IS circuit pack 16b and IS/ES circuit pack 18 will store the address and path information in their respective ES-IS databases. Thus, IS circuit pack 16b and IS/ES circuit pack 18 record the NE7 Hello PDU in their respective databases, but correlate the path of the Hello PDU to circuit pack 16a. Consequently, if either circuit pack 16b or 18 receives a message with a destination address of NE7, that circuit pack will forward the message to IS circuit pack 16a in accordance with its ES-IS database.

Similarly, when network element NE5 broadcasts a Hello PDU, IS/ES circuit pack 18 will rebroadcast the Hello PDU to the IS circuit packs 16a–b through the internal LAN 20 to IS circuit packs 16a–b. Once again, the IS circuit packs 16a–b will record the Hello PDU from IS/ES circuit pack 18 in their routing databases, correlating the Hello PDU to IS/ES circuit pack 18. Hence, from the point of view of IS circuit pack 16a, it will appear that the internal connection between IS circuit pack 16a and IS/ES circuit pack 18 is a direct connection to network element NE5 (and to network element NE4).

Referring to the network element shown in FIG. 2b, the rebroadcast of external Hello PDUs would be the same as that described above; however, rather than rebroadcasting via an internal LAN, the receiving circuit pack would forward the message to other circuit packs to which it had a direct connection.

Figure 3A:
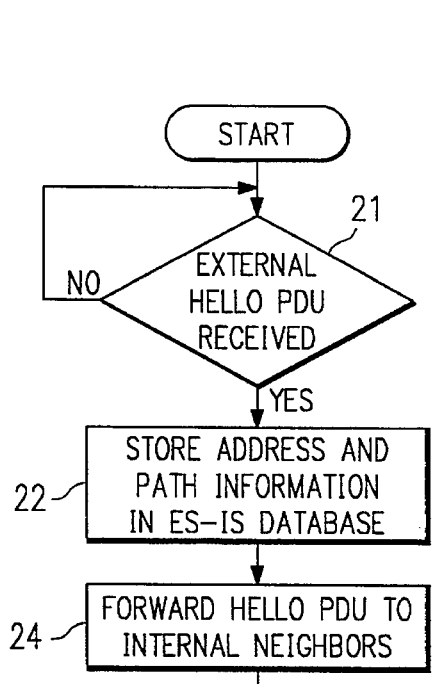
FIGS. 3a–b illustrate flow charts describing a method of communicating database information used in the preferred embodiment.
Figure 3B:
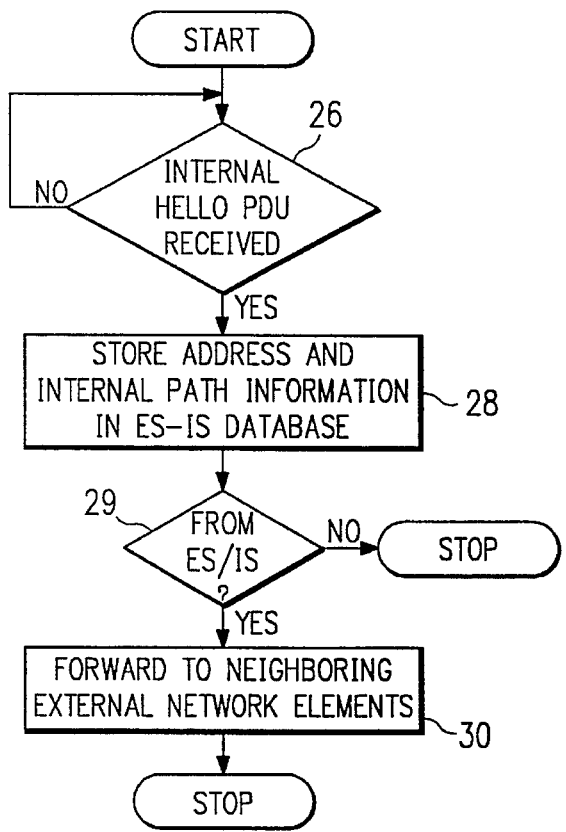

FIGS. 3a–b illustrate flow charts describing the routing of Hello PDUs, as described above. FIG. 3a illustrates the steps taken by a circuit pack when receiving a Hello PDU from an external network element 12. When an external Hello PDU is received in decision block 21, the receiving circuit pack stores the address and path information in its ES-IS database (block 22). In block 24, the receiving circuit pack forwards the Hello PDU to its internal neighbor circuit packs.

FIG. 3b illustrates the steps taken by a circuit pack when receiving a Hello PDU from another circuit pack in the network element 12, i.e., when a neighboring circuit pack is retransmitting an external Hello PDU. When the internal (retransmitted) Hello PDU is received in decision block 26, the address and internal path information is stored in the receiving circuit packs ES-IS database (block 28). If the Hello PDU was not generated by the ES/IS, 18 (block 30), the receiving circuit pack does not retransmit the Hello PDU. If the Hello PDU was generated by the ES/IS 18, then the Hello PDU is forwarded to neighboring external network elements 12.

It should be noted that the internal Hello PDU referred to in decision block 26 is not the PDU generated by the network element itself for transmission to neighboring network elements. Only the ES can generate the Hello PDU for a network element in the distributed environment. Thus, when IS/ES circuit pack 18 outputs its periodic Hello PDU, IS circuit packs 16a and 16b record the Hello PDU in their ES-IS database and retransmit the Hello PDU to the external network elements to which they are directly attached.

The present invention provides significant advantages over the prior art. The number of channels handled by a network element 12 may be expanded or contracted by adding or removing circuit packs. For example, each circuit pack 16 in FIG. 2a could be designed to route five channels. The addition of each IS circuit pack would increase the channel capability of the network element by five channels. When a circuit pack is added to the network element 12, the network element 12 automatically reconfigures itself as Hello PDUs are received by the circuit packs and retransmitted to adjacent circuit packs to update their respective databases.

Figure 4A:
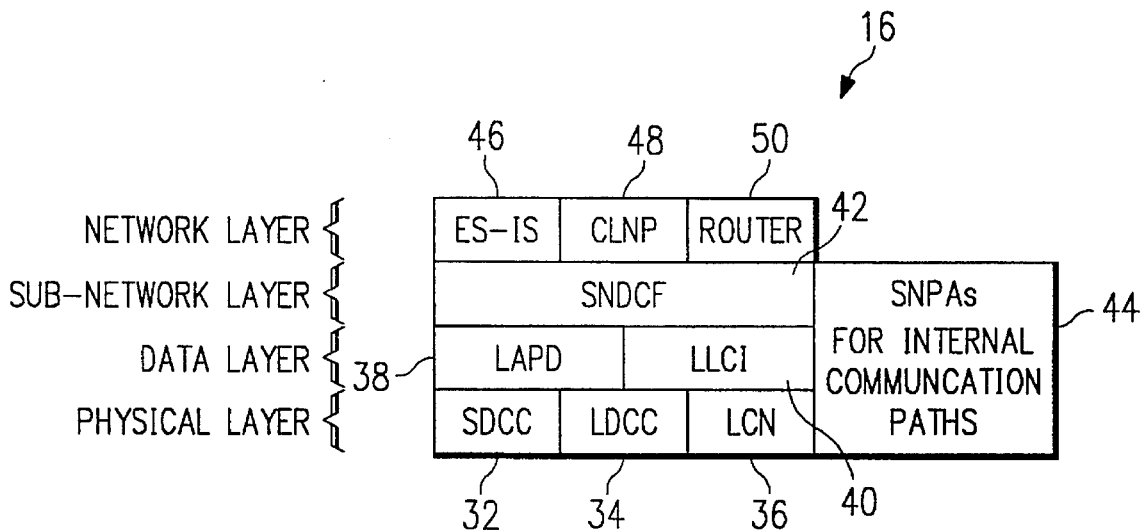
FIGS. 4a–b illustrate block diagrams of the IS and ES-IS circuit packs shown in FIG. 2.
Figure 4B:
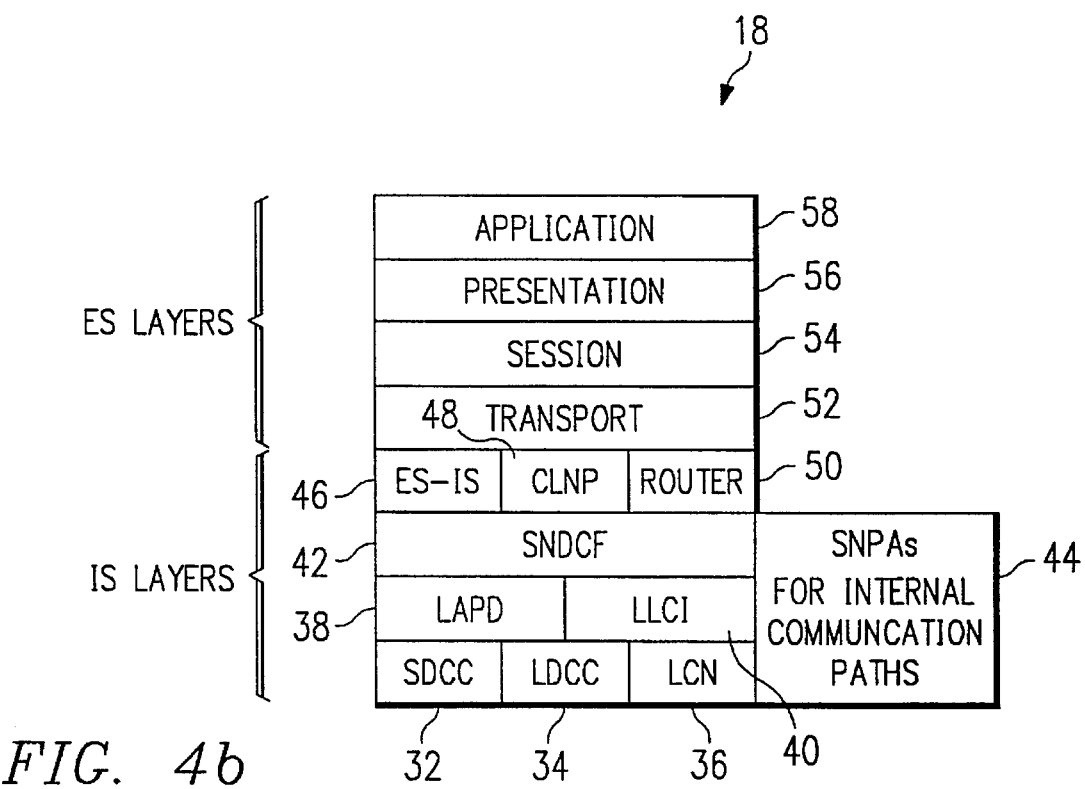

FIGS. 4a–b illustrate block diagrams of an IS circuit pack and an ES/IS circuit pack, respectively. For illustrative purposes, the block diagrams are specific for a SONET application; however, the present invention may be used in connection with other protocols as well. The IS circuit pack comprises three layers: the physical layer, data layer and network layer. The physical layer comprises SDCC (section data communication channel) 52, LDCC (line data communication channel) 34 and LCN (local communication network) 36 ports. These ports are coupled to the other network elements and the LCN 14. The data layer comprises the LAPD 38 and LLCI circuitry 40. The network layer includes the sub-network data communication function circuitry comprising a SNPA 44 (sub-network port attachment) coupled to the SNDCF 42 (sub-network data communication function) circuitry. The network layer further comprises the ES-IS database 46, the CLNP 48 (Connectionless Network Protocol) and router circuitry 50.

The various portions of the IS circuit pack are well-known in the art. The architecture shown in FIGS. 4a–b conforms to the Open Systems Interconnection (OSI) basic reference model promulgated by the International Organization for Standardization (ISO). The basic reference model uses an architecture of different data communications functions segmented into functional layers. The IS layers (Layers One, Two, Three, by convention) primarily route the data. Layer One, the physical interface layer, includes the ports for connecting to the other network elements and LCNs. Layer Two, the data link layer, manages the transfers of data frames from one Open System to another. This layer uses a protocol (shown in FIG. 4a as LAPD) which provides error control, flow control and failure recovery. Layer Three, the network layer, establishes end-to-end connections, provides flow control, recovers from Layer Two failures, and provides diagnostic functions. The network layer and subnetwork functions are described in ISO 8648 and ISO 8473 Addendum 3.

The modifications to convert an existing single board network element design to implement the distributed routing system described above would involve the inclusion of the SNPA to provide an internal communications channel and a slight modification to the ES-IS database coding to support the forwarding of Hello PDUs.

In FIG. 4b, a block diagram of an ES/IS circuit pack is shown. In addition to the IS layers described in connection with FIG. 4a, the ES layers include the transport, session, presentation and application layers. Layer Four, the transport layer 52, ensures that an end-to-end connection has been established between two Open Systems. Layer Five, the session layer 54, provides synchronization control of data between the Open Systems. Layer Six, the presentation layer 56, assures that the user information is correctly formatted. Layer Seven, the application layer 58, provides an interface to a user application. The implementation of the present invention does not require any modification of these layers.

Although the present invention and its advantages have been described in detail, it should be understood that various changes, substitutions and alterations can be made herein without departing from the spirit and scope of the invention as defined by the appended claims.

What is claimed is:

1. A network element for use in a digital communications system, comprising:

a plurality of internal routing circuits, each routing circuit comprising:
    one or more ports for communicating with devices external to the network element, such that the network element can be combined with other network elements to form a communications network;
    one or more ports for communicating with other of said routing circuits of the network element;
    a database for storing address and path information received via said ports; and
    circuitry for retransmitting address information received from one of said devices external to the network element to other of said routing circuits; and
internal communication circuitry for coupling said routing circuits.

2. The network element of claim 1 wherein said internal communication circuitry comprises a local area network.

3. The network element of claim 1 one of said routing circuits comprises end system for receiving messages from the external devices to said network element.

4. The network element of claim 1 wherein said database comprises a database for storing NSAP address information.

5. A network element for use in an ES-IS digital communications system, comprising:

a plurality of routing circuits coupled to external communications devices external to the network element, each routing circuit comprising:
    circuitry for receiving periodic Hello PDUs from the communication devices external to the network element to which the routing circuit is coupled;
    circuitry for retransmitting a received Hello PDU to other of said routing circuits in the network element, said retransmitted Hello PDU identifying the sending routing circuit as the source of the Hello PDU; and
    circuitry for storing address and path information responsive to receiving a Hello PDU from one of said communication devices external to the network element or another of said routing circuits in said network element; and
circuitry for coupling said routing circuits.

6. The network element of claim 5 wherein said storing circuitry comprises an ES-IS database.

7. The network element of claim 5 wherein each routing circuit further comprises circuitry for periodically removing address and path information from said database.

8. The network element of claim 5 and further comprising an end system for receiving messages from the external devices addressed to the network element.

9. A digital communications network comprising:

a plurality of network elements, one or more of said network elements comprising:
    a plurality of internal routing circuits, each routing circuit comprising:
        one or more ports for communicating with devices external to the network element, such that the network element can be combined with other network elements to form a communications network;
        one or more ports for communicating with other of said routing circuits of the network element;
        a database for storing address and path information received via said ports;

circuitry for retransmitting address information received from one of said devices external to the network element to other of said routing circuits; and internal communication circuitry for coupling said routing circuits; and communications links coupling said network elements.

10. The communication network of claim 9 wherein said communication links comprise optical fibers.

11. The communication network of claim 9 and further comprising a local communications network to one or more of the network elements.

12. The communication network of claim 9 wherein said one or more network elements further comprise end system circuitry for receiving messages from the external devices addressed thereto.

13. The communication network of claim 9 wherein said internal communication circuitry comprises a local area network.

14. A method of routing messages through a network element in a communications network including a plurality of such network elements, comprising the steps of:

receiving in a first routing circuit internal to network element a first communication sent from a communication device external to the network element indicating the address of the sending external communication device;

transmitting a second communication from said first routing circuit to other routing circuits internal to said network element indicating the address received in said first communication;

storing the address and path information relating to said first routing circuit in said other routing circuits responsive to said second communication; and routing messages received by said other routing circuits for said address to said first routing circuit responsive to said stored address and path information.

15. The method of claim 14 wherein said transmitting step comprises the step of transmitting said second communication to said other routing circuits via a local area network.

16. The method of claim 14 and further comprising the step of storing messages from the external devices addressed to the network element in an end system.

17. The method of claim 14 and further comprising the step of periodically removing address and path information from databases associated with said routing circuits.

* * * * *